United States Patent
Fukuda et al.

(10) Patent No.: US 6,721,256 B2
(45) Date of Patent: Apr. 13, 2004

(54) PHASE DETECTION USING SAMPLED DATA

(75) Inventors: Katsuhiko Fukuda, Kato (JP); Kenichi Hamada, Kato (JP); Masakazu Taguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 291 days.

(21) Appl. No.: 09/957,211

(22) Filed: Sep. 20, 2001

(65) Prior Publication Data

US 2002/0181375 A1 Dec. 5, 2002

(30) Foreign Application Priority Data

May 31, 2001 (JP) ........................................ 2001-165588

(51) Int. Cl.[7] ................................................ G11B 7/00
(52) U.S. Cl. .................. 369/59.22; 369/59.19; 369/47.28; 369/47.48
(58) Field of Search ...................... 369/47.1, 47.28, 369/47.35, 47.48, 53.1, 53.22, 59.1, 59.12, 59.19, 59.2, 59.22, 59.27

(56) References Cited

U.S. PATENT DOCUMENTS 6,151,282 A  * 11/2000  Hamada et al. .......... 369/59.19
6,317,471 B1 * 11/2001  Horigome et al. .......... 375/341

FOREIGN PATENT DOCUMENTS

JP          6-290545          10/1994

* cited by examiner

*Primary Examiner*—Muhammad Edun
(74) *Attorney, Agent, or Firm*—Greer, Burns & Crain, Ltd.

(57) ABSTRACT

A clock adjustment device for a data reproduction apparatus includes an edge detection part detecting an edge of a reproduced signal corresponding to a predetermined synchronization pattern based on a state of change of sampled values obtained in synchronism with a clock signal from the reproduced signal, a timing signal output part outputting a timing signal in a given cycle determined by the synchronization pattern from a timing at which the edge of the reproduced signal is detected, and a phase adjustment part adjusting a phase of the clock signal when the edge of the reproduced signal is detected and every time the timing signal is output.

22 Claims, 7 Drawing Sheets

PHASE DETECTION USING SAMPLED DATA

BACKGROUND OF THE INVENTION

1. Field of the Invention

The present invention generally relates to phase detection using sampled data, and more particularly to a clock adjustment device employed in a data reproduction apparatus such as an optical disk unit or a magnetic disk unit for adjusting the phase of a clock signal used for reproducing recorded data based on values sampled in synchronism with the clock signal from a reproduced signal from a recording medium and a data reproduction apparatus including such a clock adjustment device. The present invention also relates to an edge detection device and method for detecting an edge of the reproduced signal.

2. Description of the Related Art

Recently, as information is being recorded on a recording medium such as a magneto-optical disk at a higher density, more efforts are being made to increase a data transfer rate in the reproduction system of the magneto-optical disk. As a method of performing high-speed information reproduction with high accuracy from such a magneto-optical disk recorded with information at high density, a recording and reproduction method according to PRML (Partial Response Maximum Likelihood) is proposed.

According to this PRML recording and reproduction method, a magneto-optical disk is recorded with a signal obtained by modulating data to be recorded into a partial response (PR) waveform. Then, a reproduced signal from the magneto-optical disk is sampled in synchronism with a predetermined clock signal so as to obtain sampled values. Data having maximum likelihood is reproduced from the sampled values in accordance with a maximum likelihood (ML) algorithm such as the Viterbi decoding algorithm.

In a data reproduction apparatus based on the above-described PRML recording and reproduction method, such as an optical disk unit, it is necessary to adjust the phase of a clock signal so that sampled values obtained by sampling a reproduced signal from a recording medium such as a magneto-optical disk in synchronism with the clock signal are characterized by a partial response waveform. For instance, in the case of a PR(1,1) waveform, the sampled values are 1s (peak), 0s (center), and −1s (bottom).

A conventional clock adjustment device binarizes a reproduced signal using a predetermined slice level and adjusts the phase of a clock signal using a PLL circuit so that the clock signal synchronizes with the rising or trailing edges of the binarized reproduced signal.

Further, instead of performing analog processing on the reproduced signal as described above, it is practicable to detect an edge part of the reproduced signal based on the state of change of sampled values obtained by sampling the reproduced signal in synchronism with the clock signal. For instance, if first through third successive sampled values are obtained from a reproduced signal of a given pattern so that the reproduced signal monotonously increases in level between the first and third sampled values with the second or third sampled value being higher than a reference level, it may be determined that the three sampled values correspond to a rising edge part of the reproduced signal.

On the basis of relationships among three sampled values that, correctly, should be obtained from the reproduced signal of the given pattern, the phase difference of the clock signal is obtainable based on relationships among the above-described three successive sampled values corresponding to the rising edge of the reproduced signal. The phase of the clock signal is adjustable so as to eliminate the phase difference.

In a clock adjustment device that detects edges of a reproduced signal based on the state of change of sampled values obtained in synchronism with a clock signal from the reproduced signal and adjusts the phase of the clock signal so that the clock signal synchronizes with the edges as previously described, edge detection is not stably performed if the clock signal is in a step-out state, or in a state where the phase of the clock signal is unlocked, in process of phase adjustment.

Suppose that a densest pattern (hereinafter referred to as a 2T pattern $Q_{2T}$) of a PR(1,1) waveform as shown in FIG. 1 is written to a magneto-optical disk as a synchronization pattern (a given pattern) and the phase of the clock signal is adjusted based on a reproduced signal of the 2T pattern $Q_{2T}$. In such a case, with the clock signal being in a step-out state with the phase of the clock signal being unmatched with the correct sampling timing of the 2T pattern $Q_{2T}$, of successive sampled values $Y_{t-6}$, $Y_{t-5}$, and $Y_{t-4}$, the sampled value $Y_{t-5}$, for instance, may be recognized as a rising edge of the reproduced signal, or of successive sampled values $Y_{t-3}$, $Y_{t-2}$, and $Y_{t-1}$ also having an increase tendency ($Y_{t-3}<Y_{t-2}<Y_{t-1}$), the sampled value $Y_{t-2}$ may be recognized as a rising edge.

In this case, even if it is determined from the sampled value $Y_{t-5}$ that "the phase lags", it is determined from the sampled value $Y_{t-2}$ that "the phase leads", thus preventing the phase of the clock signal from being adjusted.

SUMMARY OF THE INVENTION

It is a general object of the present invention to provide a clock adjustment device, a data reproduction apparatus including a clock adjustment device, and an edge detection device and method in which the above-described disadvantage is eliminated.

A more specific object of the present invention is to provide a clock adjustment device for performing stable adjustment on the phase of a clock signal based on the state of change of sampled values obtained in synchronism with the clock signal from a reproduced signal corresponding to a given pattern and a data reproduction apparatus including such a clock adjustment device.

Yet another more specific object of the present invention is to provide an edge detection device and method for detecting an edge of the reproduced signal with good accuracy so that the phase of the clock signal can be adjusted earlier.

The above objects of the present invention are achieved by a clock adjustment device for a data reproduction apparatus for reproducing recorded data from a recording medium in accordance with a maximum likelihood decoding algorithm corresponding to a recording code of partial response by using sampled values obtained by sampling a reproduced signal corresponding to a predetermined synchronization pattern from the recording medium in synchronism with a clock signal, the clock adjustment device including an edge detection part detecting an edge of the reproduced signal based on a state of change of the sampled values, a timing signal output part outputting a timing signal in a given cycle determined by the synchronization pattern from a timing at which the edge of the reproduced signal is detected, and a phase adjustment part adjusting a phase of the clock signal when the edge of the reproduced signal is detected and every time the timing signal is output.

According to the above-described clock adjustment device, after the phase of a clock signal is adjusted when an edge of a reproduced signal corresponding to a predetermined synchronization pattern is detected based on the state of change of sampled values of the reproduced signal, the phase of the clock signal is adjusted in a given cycle determined by the synchronization pattern. Therefore, after the edge of the reproduced signal is detected, the phase of the clock signal is adjustable in a cycle in which the reproduced signal rises. The given cycle determined by the synchronization pattern corresponds to a cycle in which the synchronization pattern rises.

The above objects of the present invention are also achieved by a data reproduction apparatus for reproducing recorded data from a recording medium in accordance with a maximum likelihood decoding algorithm corresponding to a recording code of partial response by using sampled values obtained by sampling a reproduced signal corresponding to a predetermined synchronization pattern from the recording medium in synchronism with a clock signal, the data reproduction apparatus including a clock adjustment device which includes an edge detection part detecting an edge of the reproduced signal based on a state of change of the sampled values, a timing signal output part outputting a timing signal in a given cycle determined by the synchronization pattern from a timing at which the edge of the reproduced signal is detected, and a phase adjustment part adjusting a phase of the clock signal when the edge of the reproduced signal is detected and every time the timing signal is output.

According to the above-described data reproduction apparatus, data is reproducible from sampled values obtained from a reproduced signal corresponding to a predetermined synchronization pattern in synchronism with a clock signal whose phase is adjusted when an edge of the reproduced signal is detected based on the state of change of the sampled values and, thereafter, is adjusted in a given cycle determined by the synchronization pattern.

The above objects of the present invention are also achieved by an edge detection device for detecting an edge of a reproduced signal from a recording medium, the reproduced signal corresponding to a predetermined synchronization pattern, the edge detection device including an edge determination part determining, using first through fourth successive sampled values in an order sampled from the reproduced signal and based on a relationship between the first and third sampled values and a relationship between the second and fourth sampled values, whether or not the second or third sampled value corresponds to the edge of the reproduced signal.

According to the above-described edge detection device, edge detection is performed based on a relationship between first and third sampled values and a relationship between second and fourth sampled values of the four successive first through fourth sampled values, thereby realizing the edge detection with more accuracy compared with a conventional edge detection method that, for instance, employs three successive sampled values.

The above objects of the present invention are further achieved by a method of detecting an edge of a reproduced signal from a recording medium, the method including the steps of (a) obtaining first through fourth successive sampled values in an order sampled from the reproduced signal, (b) calculating a first difference between the first and third sampled values and a second difference between the second and fourth sampled values, and (c) determining whether the second or third sampled value corresponds to the edge of the reproduced signal based on the first and second differences obtained in the step (b).

According to the above-described method, edge detection is performed based on a difference between first and third sampled values and a difference between second and fourth sampled values of the four successive first through fourth sampled values, thereby realizing the edge detection with more accuracy compared with the conventional edge detection method employing three successive sampled values.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description will now be given, with reference to the accompanying drawings, of an embodiment of the present invention.

Figure 1:
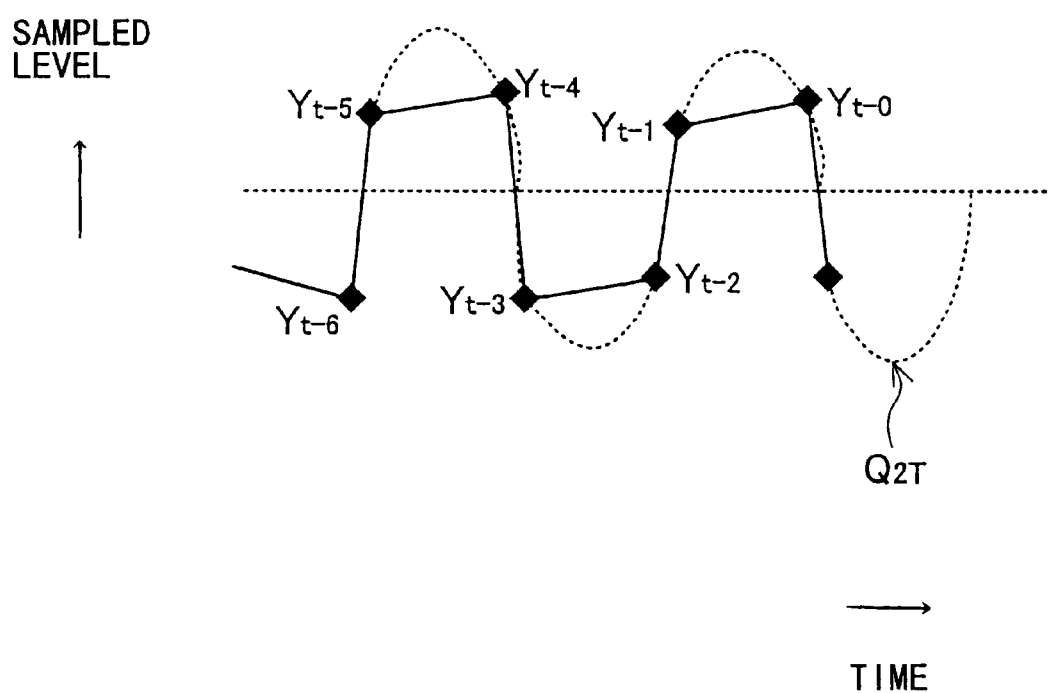
FIG. 1 is a diagram showing sampled values obtained from a reproduced signal corresponding to a 2T pattern of a PR(1,1) waveform.
Figure 2:
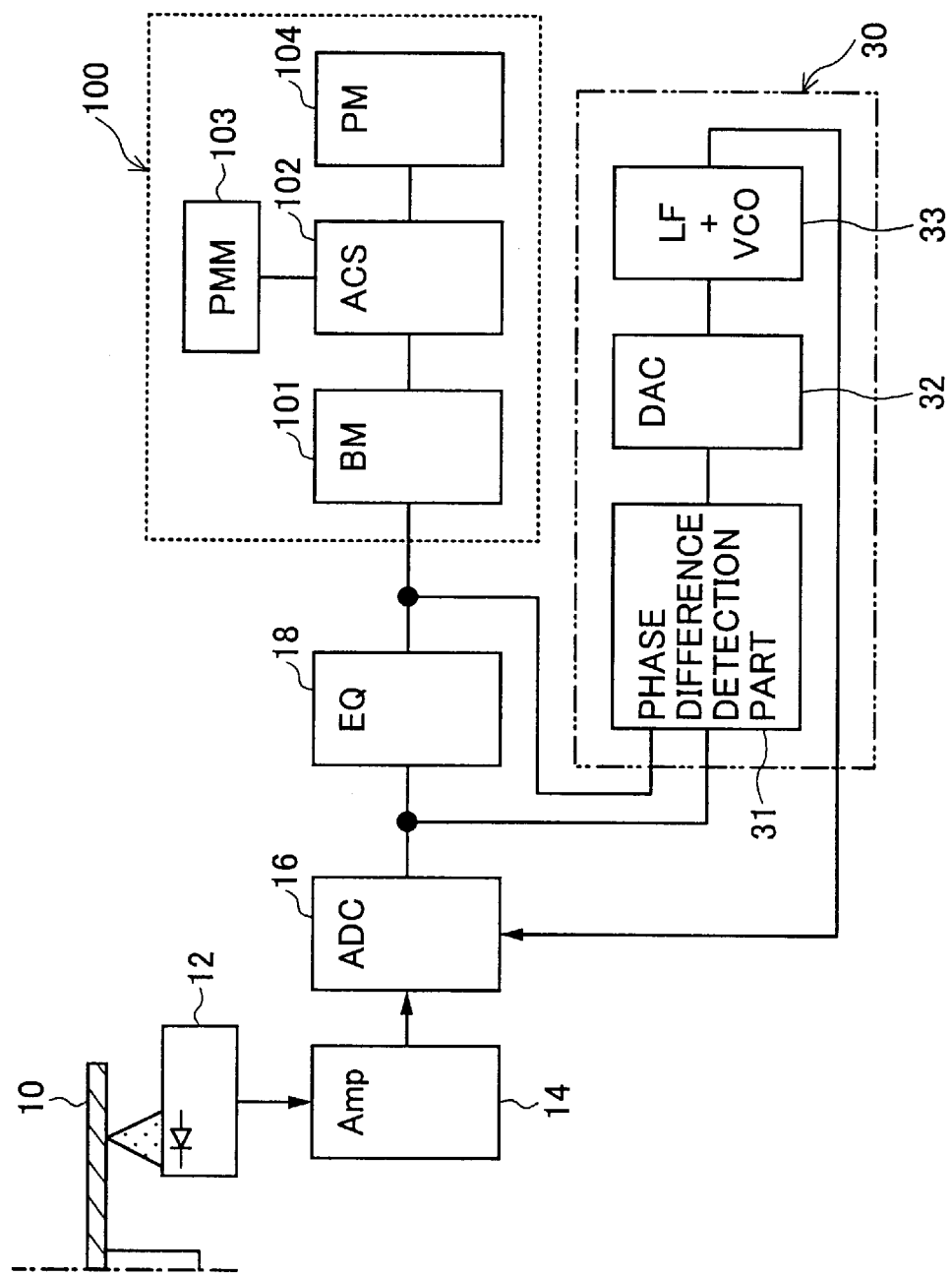
FIG. 2 is a diagram showing a structure of a data reproduction apparatus to which a clock adjustment device according to an embodiment of the present invention is applied.

FIG. 2 is a diagram showing a structure of a data reproduction apparatus to which a clock adjustment device according to the embodiment of the present invention is applied. The data reproduction apparatus is included in an optical disk unit using a magneto-optical disk (MO) as a recording medium.

According to FIG. 2, the data reproduction apparatus includes an optical head 12 for optically reading data from a magneto-optical disk 10 and outputting an electrical signal, an amplifier 14 for amplifying the output signal of the optical head 12, an analog-to-digital converter circuit (ADC) 16, a waveform equalizer circuit (EQ) 18, a Viterbi detector 100, and a clock signal generation circuit 30. The output signal of the amplifier 14 is supplied to the ADC 16 as a reproduced signal. The ADC 16 performs A/D conversion on the reproduced signal in synchronism with a clock signal generated by the clock signal generation circuit 30, and outputs values obtained by the conversion operation as sampled values. That is, the reproduced signal is sampled in synchronism with the clock signal in the ADC 16.

The sampled values successively output from the ADC 16 in synchronism with the clock signal are subjected to digital equalization in the waveform equalizer circuit 18 and thereafter, supplied to the Viterbi detector 100. The Viterbi detector 100 includes a branch metric calculation unit (BM) 101, an add-compare-select unit (ACS) 102, a path metric memory (PMM) 103, and a path memory 104. The Viterbi detector 100 reproduces data having maximum likelihood from the supplied sampled values in accordance with the well-known Viterbi algorithm (a maximum likelihood decoding algorithm).

The clock signal generation circuit 30 includes a phase difference detection part 31, a digital-to-analog converter circuit (DAC) 32, and a phase adjustment oscillation unit 33. The phase difference detection part 31, to which the sampled values are successively supplied respectively from the ADC 16 and the waveform equalizer circuit 18, detects a phase difference amount of the clock signal as will be later described. The phase difference amount of the clock signal detected in the phase difference detection part 31 is converted into a voltage level (an analog value) in the DAC 32. The phase adjustment oscillation unit 33 includes a loop filter (LF) and a voltage-controlled oscillator (VCO) and controls the phase of the predetermined oscillation clock signal by the voltage level corresponding to the phase difference amount so that the phase difference amount is reduced. The clock signal phase-adjusted in the phase adjustment oscillation unit 33 is supplied to the ADC that samples the reproduced signal.

Here, a description will be given of the phase difference detection part 31.

Figure 3:
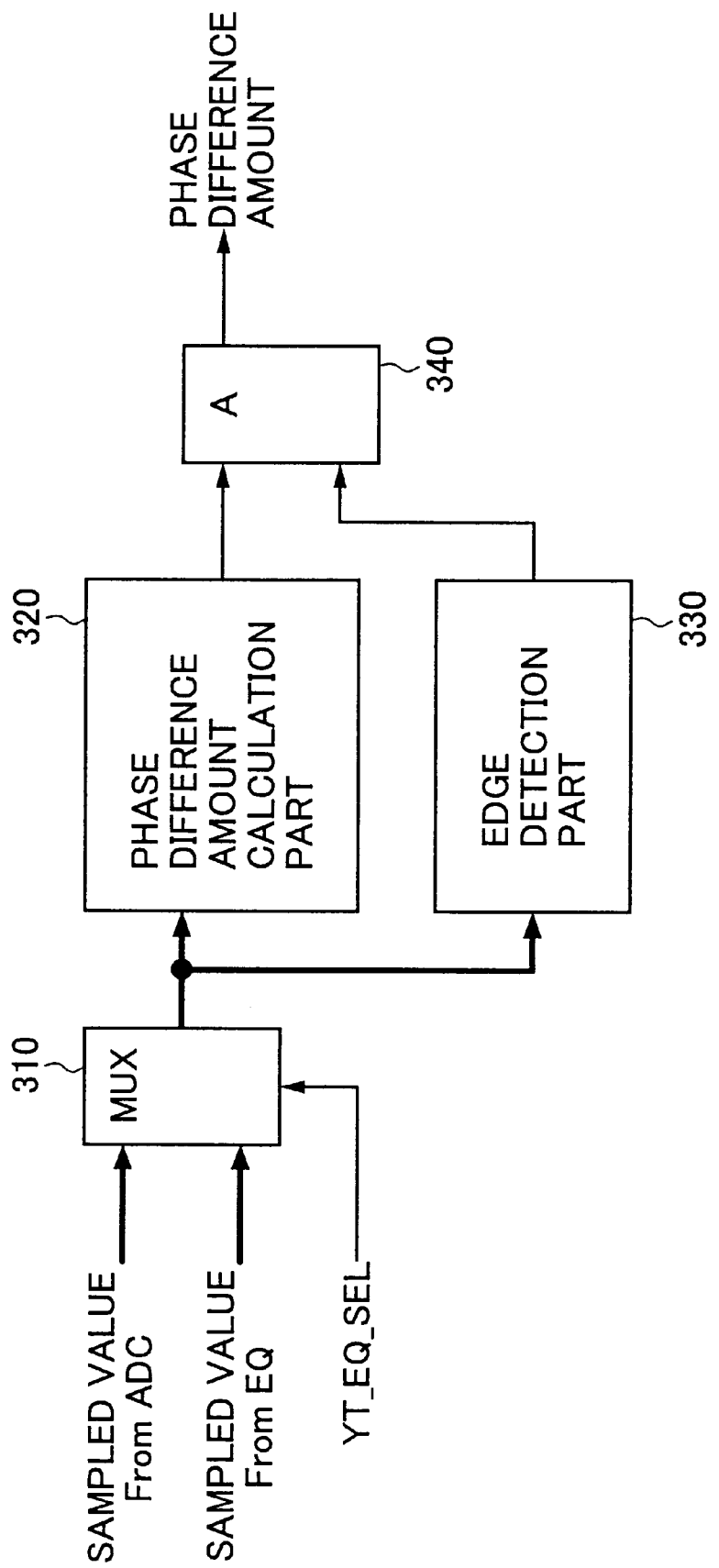
FIG. 3 is a block diagram showing a structure of a phase difference detection part of the data reproduction apparatus of FIG. 2.

FIG. 3 is a diagram showing a structure of the phase difference detection part 31.

According to FIG. 3, the phase difference detection part 31 includes a selector circuit (MUX) 310, a phase difference amount calculation part 320, an edge detection part 330, and an AND circuit 340. The selector circuit 310 selects the sampled values supplied from the ADC 16 or the sampled values supplied from the waveform equalizer circuit 18 as sampled values used for phase error detection based on a selection control signal YT_EQ_SEL supplied from a control unit (MPU) (not shown in the drawing). In the case of adjusting the phase of the clock signal at an earlier timing, it is preferable to select the sampled values supplied from the ADC 16. In the case of adjusting the phase of the clock signal more stably, it is preferable to select the sampled values supplied from the waveform equalizer circuit 18.

The phase difference amount calculation part 320, based on the state of change of the sampled values successively input thereto via the selector circuit 310, calculates the phase difference amount of the clock signal for obtaining the sampled values. For instance, the phase difference amount calculation part 320 calculates the phase difference amount of the clock signal in the following manner.

For instance, the sampled values are obtained from the reproduced signal of a synchronization pattern such as a 2T pattern of a PR(1,1) waveform recorded in the VFO region of each sector of the magneto-optical disk 10 ideally in the order of a peak value (1), a center value (0), a bottom value (−1), a center value (0), a peak value (1), . . . . That is, the phase of the clock signal is adjusted so that the peak values (1s), center values (0s), and bottom values (−1s) are sampled in the above-described ideal order as sampled values. If the clock signal includes no phase difference, or if the clock signal has its phase locked, a first difference between the first two sampled values of three successive sampled values is equal to a second difference between the last two sampled values. This indicates that a difference between the first and second differences corresponds to the phase difference amount of the clock signal for obtaining the sampled values.

Therefore, the phase difference amount calculation part 320 calculates an amount based on a difference between the above-described first and second difference as the phase difference amount and outputs the amount as the phase difference amount.

The edge detection part 330 detects sampled values corresponding to an edge (for instance, a rising edge) of the reproduced signal based on the state of change of the sampled values successively supplied via the selector circuit 310 and outputs an edge pulse. The phase difference amount of the clock signal obtained in the phase difference amount calculation part 320 and the edge pulse output from the edge detection part 330 are input to the AND circuit 340. As a result, the phase difference amount that is supplied from the phase difference amount calculation part 320 when the edge pulse is valid, that is, when the edge detection part 330 detects the sampled values corresponding to the rising edge of the reproduced signal, is output from the AND circuit 340. Therefore, the phase difference detection part 31 having the structure as shown in FIG. 3 outputs the phase difference amount of the clock signal at every rising edge of the reproduced signal.

Here, a description will be given of the edge detection part 330.

Figure 4:
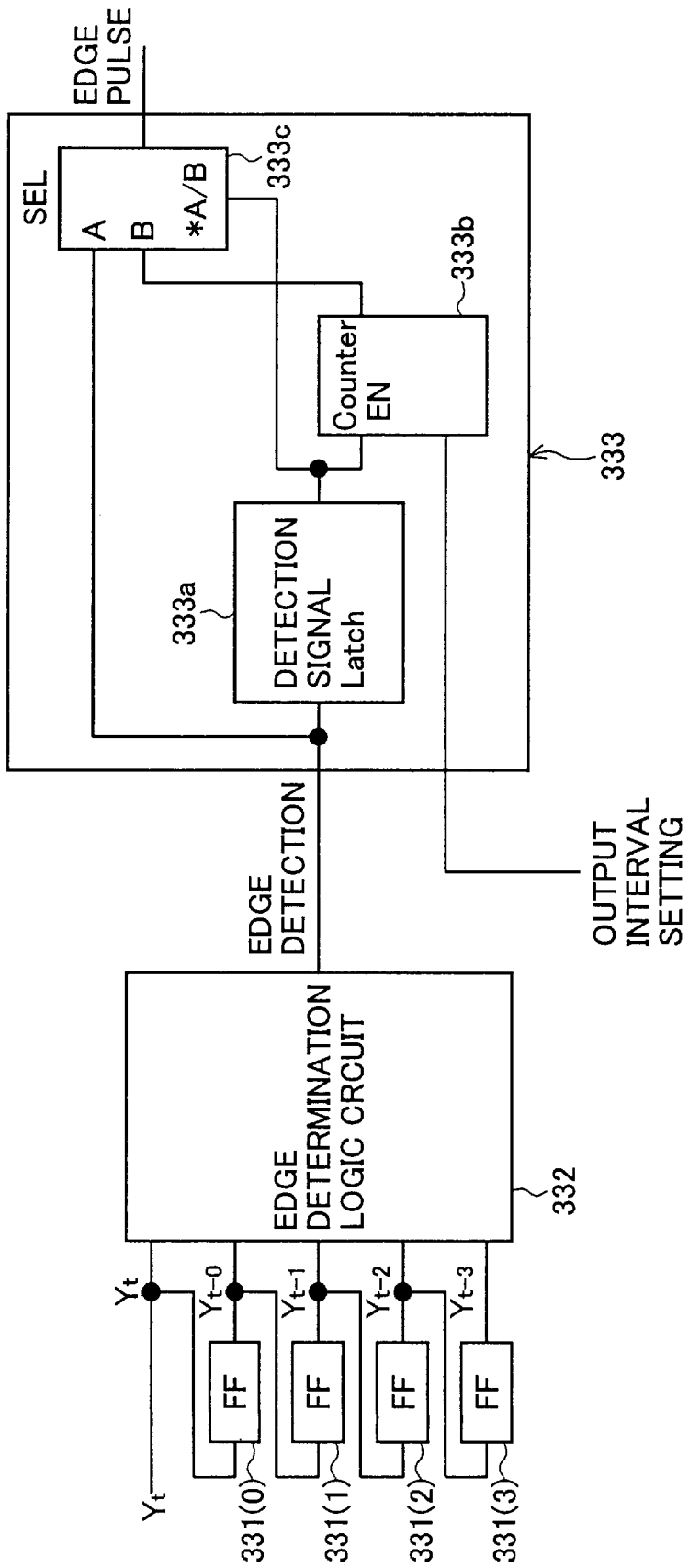
FIG. 4 is a diagram showing a structure of an edge detection part of the phase difference detection part of FIG. 3.

FIG. 4 is a diagram showing a structure of the edge detection part 330.

According to FIG. 4, the edge detection part 330 includes four flip-flops 331(0) through 331(3), an edge determination logic circuit 332, and an edge pulse generation circuit 333. The four flip-flops 331(0) through 331(3) are connected in series. A sampled value $Y_t$ is input to the first flip-flop 331(0) and is shifted through the flip-flops 331(1) through 331(3) in synchronism with the clock signal. The sampled value $Y_t$ and sampled values $Y_{t-0}$ through $Y_{t-3}$ set in the flip-flops 331(0) through 331(3), respectively, are supplied to the edge determination logic circuit 332.

The edge determination logic circuit 332 detects the rising edge of the reproduced signal on the basis of the state of change of the four successive sampled values $Y_{t-0}$ through $Y_{t-3}$ and outputs an edge detection signal. A description of a logic for edge determination in the edge determination logic circuit 332 will be given later.

The edge pulse generation circuit 333 includes a latch circuit 333a, a counter 333b, and a selector circuit 333c. The latch circuit 333a latches the edge detection signal supplied from the edge determination logic circuit 332. Latching the edge detection signal, the latch circuit 333a makes an output signal (a latch signal) thereof valid. The counter 333b, in which an output interval value (a count value) supplied from the control unit (not shown in the drawing) is set, is supplied with the latch signal supplied from the latch circuit 333a as an enabling signal. When the enabling signal (latch signal) is made valid, the counter 333b starts a count operation in synchronism with the clock signal and outputs a pulse signal every time a counted number reaches the set count value.

The selector circuit 333c selects the edge detection signal (A) supplied from the edge determination logic circuit 332 or the pulse signal (B) supplied from the counter 333b based on the state of the latch signal supplied from the latch circuit 333a. That is, the selector circuit 333c selects and outputs as the edge pulse the edge detection signal supplied from the edge determination logic circuit 332 if the latch signal is not in a valid state, and the pulse signal supplied from the counter 333b if the latch signal is in a valid state.

According to the edge detection part 330 of the above-described configuration, when the edge determination logic circuit 332 detects the rising edge of the reproduced signal based on the four successive sampled values, the edge detection signal is output as the edge pulse, and when the latch signal of the latch circuit 333a is made valid by the edge detection signal, thereafter, the pulse signal supplied from the counter 333b is output as the edge pulse.

The count value (output interval value) set in the counter 333b is provided as described below.

Provided that each sector of the magneto-optical disk 10 has its VFO region recorded with the 2T pattern $Q_{2T}$ of the PR(1,1) waveform as a synchronization pattern for the phase adjustment of the clock signal, the ideal sampled values are, as previously described, a repetition of a series of the peak value (1), the center value (0), the bottom value (−1), the center value (0), the peak value (1) . . . . Therefore, the center value (0) via which the sampled value changes from the bottom value (−1) to the peak value (1) corresponds to the rising edge of the reproduced signal. Therefore, the rising edge is detected every four clock pulses.

Therefore, in the case of reproducing data from a recording medium on which the above-described 2T pattern $Q_{2T}$ is recorded as a synchronization pattern, four (the number of clock pulses) is set in the counter 333b as the count value (output interval value). Thereby, the edge detection part 330 automatically outputs the edge pulse every four clock pulses after outputting as the edge pulse the edge detection signal that is based on rising edge determination in the edge determination logic circuit 332.

Further, if each sector of the magneto-optical disk 10 has its VFO region recorded with a 3T pattern $Q_{3T}$ of the PR(1,1) waveform as a synchronization pattern for the phase adjustment of the clock signal, ideal sampled values are a repetition of a series of the peak value (1), the peak value (1), the center value (0), the bottom value (−1), the bottom value (−1), the center value (0), the peak value (1), the peak value (1) . . . . Therefore, the center value (0) via which the sampled value changes from the bottom value (−1) to the peak value (1) corresponds to the rising edge of the reproduced signal. Therefore, the rising edge is detected every six clock pulses.

Therefore, in the case of reproducing data from a recording medium on which the above-described 3T pattern $Q_{3T}$ is recorded as a synchronization pattern, six (the number of clock pulses) is set in the counter 333b as the count value (output interval value). Thereby, the edge detection part 330 automatically outputs the edge pulse every six clock pulses after outputting as the edge pulse the edge detection signal that is based on edge determination in the edge determination logic circuit 332.

As described above, the edge pulse generation circuit 333 can easily measure a cycle in which the edge pulse is output based on the clock signal.

The control unit (not shown in the drawing) sets the output interval value in the counter 333b in accordance with the synchronization pattern such as the 2T pattern $Q_{2T}$ or the 3T pattern $Q_{3T}$ recorded on the magneto-optical disk 10 (recording medium) loaded into the data reproduction apparatus, that is, in accordance with a type of medium set in the data reproduction apparatus.

Figure 5:
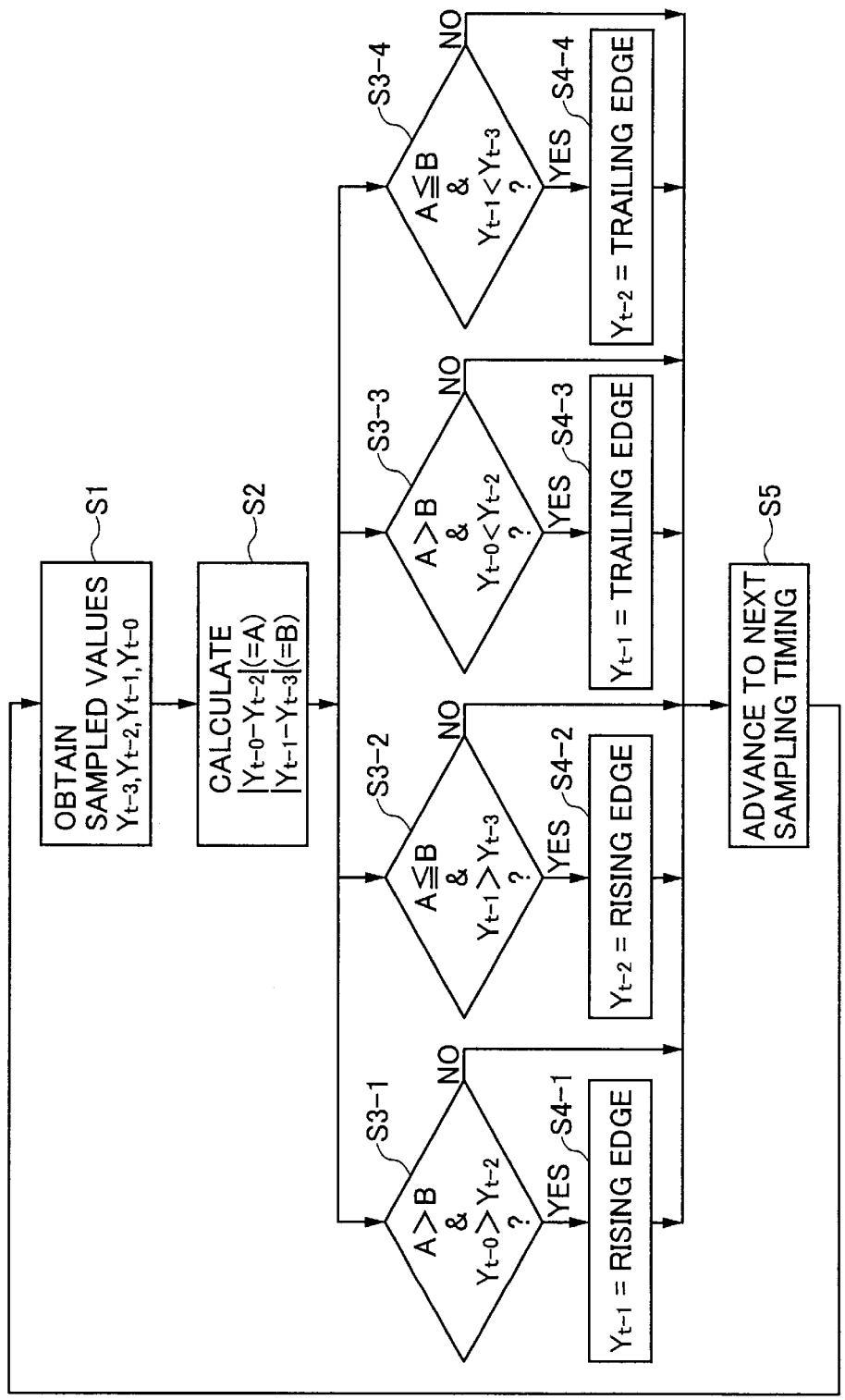
FIG. 5 is a flowchart showing an edge determination operation of an edge determination logic circuit of the edge detection part of FIG. 4.

A description will now be given, with reference to FIG. 5, of the logic for the edge determination in the edge determination logic circuit 332. FIG. 5 is a flowchart showing an operation of the edge determination logic circuit 332 in the edge determination.

First, a description will be given of a case where the rising edge of the reproduced signal is determined.

Using the four successive sampled values $Y_{t-3}, Y_{t-2}, Y_{t-1}$, and $Y_{t-0}$ (described in the order sampled, that is, first sampled, second sampled, third sampled, and fourth sampled on a time base, respectively) (step S1), in step S2, the edge determination circuit 332 calculates A and B defined by the following expressions:

$$A=|Y_{t-0}-Y_{t-2}|$$

$$B=|Y_{t-1}-Y_{t-3}|$$

Then, if it is determined in step S3-1 that the following conditions 1 and 2 are satisfied, in step S4-1, the edge determination circuit 332 determines that the sampled value $Y_{t-1}$ corresponds to the rising edge of the reproduced signal (case 1):

Condition 1 . . . A>B

Condition 2 . . . $Y_{t-0}>Y_{t-2}$

In other words, when the absolute value A of a difference between the even-numberth, that is, second and fourth sampled values $Y_{t-2}$ and $Y_{t-0}$ of the four successive sampled values $Y_{t-3}, Y_{t-2}, Y_{t-1}$, and $Y_{t-0}$ is larger than the absolute value B of a difference between the odd-numberth, that is, first and third sampled values $Y_{t-3}$ and $Y_{t-1}$ and the sampled value $Y_{t-0}$ is larger than the sampled value $Y_{t-2}$ so that the difference therebetween is positive, the edge determination logic circuit 332 determines that the sampled value $Y_{t-1}$ between the sampled values $Y_{t-2}$ and $Y_{t-0}$ corresponds to the rising edge of the reproduced signal.

After step S4-1, the operation proceeds to step S5, where the next set of four sampled values are obtained at the next sampling timing, and thereafter, returns to step S1.

If it is determined in step S3-1 that both of the conditions 1 and 2 are not satisfied, the operation goes to step S5 and then returns to step 1.

On the other hand, if it is determined in step S3-2 that the following conditions 3 and 4 are satisfied, in step S4-2, the edge determination circuit 332 determines that the sampled value $Y_{t-2}$ corresponds to the rising edge of the reproduced signal (case 2):

Condition 3 . . . A≦B

Condition 4 . . . $Y_{t-1}>Y_{t-3}$

In other words, when the absolute value B of the difference between the odd-numberth sampled values $Y_{t-3}$ and $Y_{t-1}$ of the four successive sampled values $Y_{t-3}, Y_{t-2}, Y_{t-1}$, and $Y_{t-0}$ is larger than or equal to the absolute value A of the difference between the even-numberth sampled values $Y_{t-2}$ and $Y_{t-0}$ and the sampled value $Y_{t-1}$ is larger than the sampled value $Y_{t-3}$ so that the difference therebetween is positive, the edge determination logic circuit 332 determines that the sampled value $Y_{t-2}$ between the sampled values $Y_{t-3}$ and $Y_{t-1}$ corresponds to the rising edge of the reproduced signal.

After step S4-2, the operation proceeds to step S5, where the next set of four sampled values are obtained at the next sampling timing, and thereafter, returns to step S1.

If it is determined in step S3-2 that both of the conditions 3 and 4 are not satisfied, the operation goes to step S5 and then returns to step S1.

Figure 6:
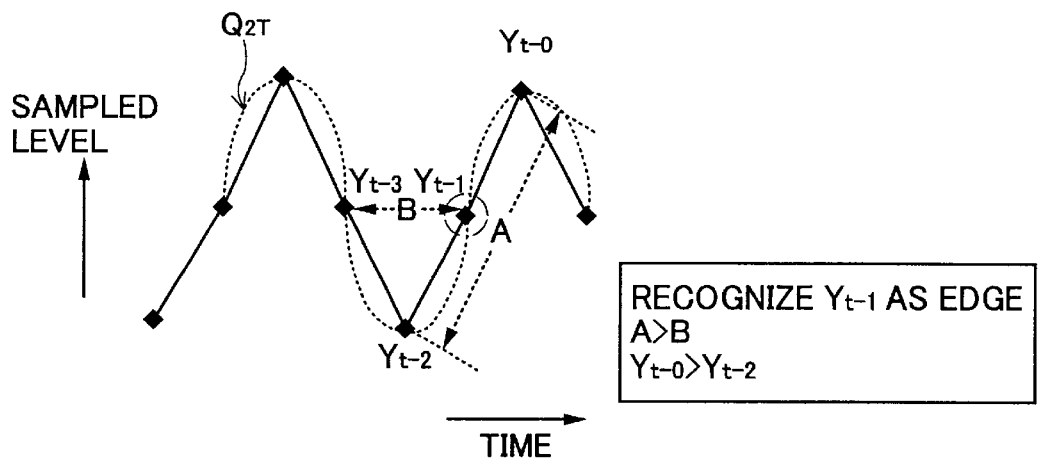
FIG. 6 is a diagram showing an example detection of a rising edge of a reproduced signal corresponding to the 2T pattern of the PR(1,1) waveform.
Figure 7:
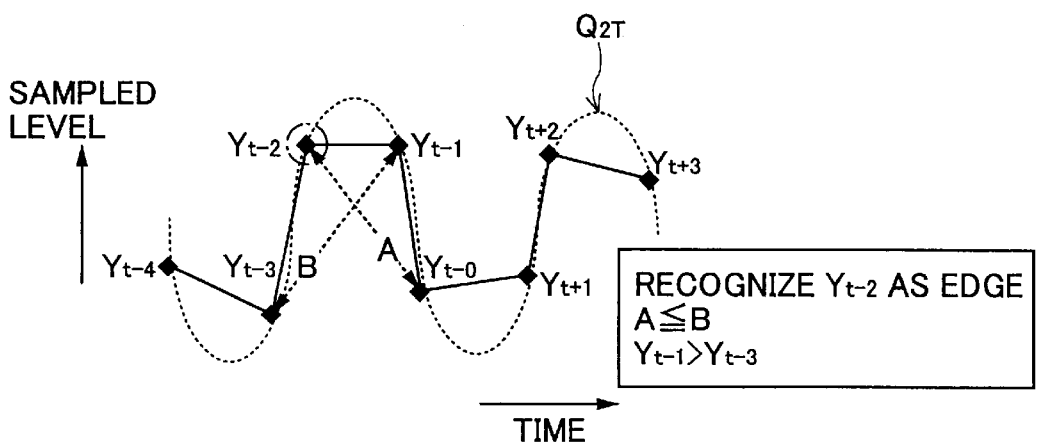
FIG. 7 is a diagram showing another example detection of the rising edge of the reproduced signal corresponding to the 2T pattern of the PR(1,1) waveform.
Figure 8:
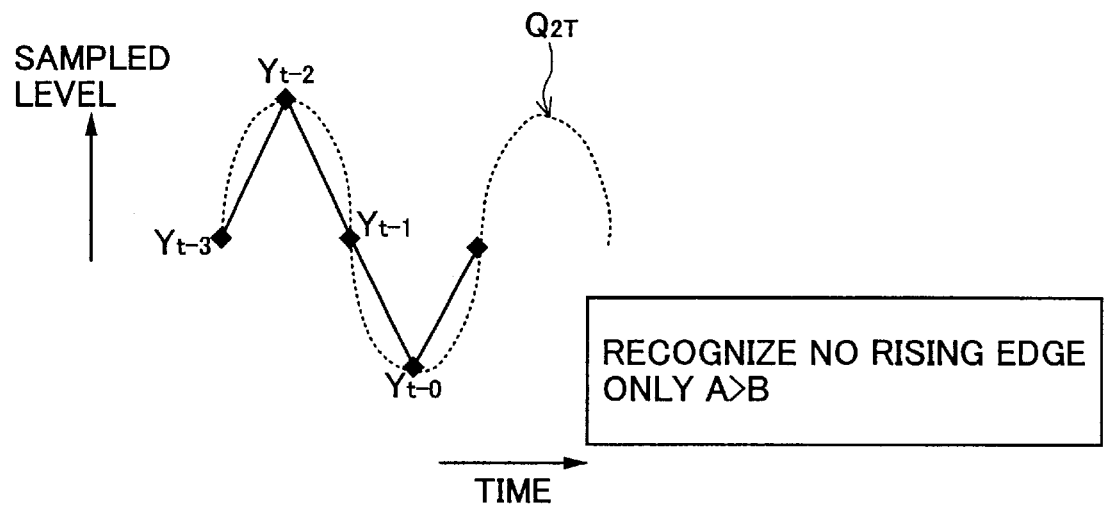
FIG. 8 is a diagram showing a case where no rising edge of the reproduced signal corresponding to the 2T pattern of the PR(1,1) waveform is detected.

In the case of using the 2T pattern $Q_{2T}$ of the PR(1,1) waveform as the synchronization pattern, for instance, rising edge detection is performed based on the above-described edge determination logic as shown in FIGS. 6 through 8.

First, in a state where the phase of the clock signal substantially matches a phase determined from the 2T pattern $Q_{2T}$, that is, in a state where the phase of the clock signal is substantially locked, as shown in FIG. 6, both conditions 1 and 2 are satisfied as in the above-described case 1. Therefore, it is determined that of the four successive sampled values $Y_{t-3}$, $Y_{t-2}$, $Y_{t-1}$, and $Y_{t-0}$, the odd-numberth sampled value $Y_{t-1}$ between the even-numberth sampled values $Y_{t-2}$ and $Y_{t-0}$ correspond to the rising edge of the reproduced signal.

Next, in a state where the phase of the clock signal is unmatched with the phase determined from the 2T pattern $Q_{2T}$ as shown in FIG. 7, both conditions 3 and 4 are satisfied as in the above-described case 2. Therefore, it is determined that of the four successive sampled values $Y_{t-3}$, $Y_{t-2}$, $Y_{t-1}$, and $Y_{t-0}$, the even-numberth sampled value $Y_{t-2}$ between the odd-numberth sampled values $Y_{t-3}$ and $Y_{t-1}$ correspond to the rising edge of the reproduced signal.

Further, in the case shown in FIG. 8, the four successive sampled values $Y_{t-3}$, $Y_{t-2}$, $Y_{t-1}$, and $Y_{t-0}$ obtained from the reproduced signal of the 2T pattern $Q_{2T}$ satisfy the condition 1 but do not satisfy the condition 2. Nor do the sampled values $Y_{t-3}$, $Y_{t-2}$, $Y_{t-1}$, and $Y_{t-0}$ satisfy the condition 3. Therefore, it is determined that none of the sampled values $Y_{t-3}$, $Y_{t-2}$, $Y_{t-1}$, and $Y_{t-0}$ corresponds to the rising edge of the reproduced signal.

In the state shown in FIG. 6 or 7, when it is determined that the sampled value $Y_{t-1}$ or $Y_{t-2}$ of the four successive sampled values $Y_{t-3}$, $Y_{t-2}$, $Y_{t-1}$, and $Y_{t-0}$ obtained from the reproduced signal of the 2T pattern $Q_{2T}$ corresponds to the rising edge of the reproduced signal so that the edge detection part 330 outputs the edge pulse, thereafter, as previously described, the edge detection part 330 automatically outputs the edge pulse every four clock pulses from the sampling timing of the sampled value $Y_{t-1}$ or $Y_{t-2}$. Therefore, even if there is a difference between the phase of the clock signal and the phase determined from the 2T pattern $Q_{2T}$ as shown in FIG. 7, for instance, edge detection is always performed in a given cycle determined from the synchronization pattern (2T pattern $Q_{2T}$), that is, every four clock pulses in this case.

Accordingly, the cycle of the rising edge detected from the synchronization pattern becomes the given cycle determined by the synchronization pattern. Therefore, for instance, of the successive sampled values $Y_{t-0}$, $Y_{t+1}$, and $Y_{t+2}$ having an increase tendency ($Y_{t-0} < Y_{t+1} < Y_{t+2}$) shown in FIG. 7, the sampled value $Y_{t+1}$ is prevented from being processed as the rising edge of the reproduced signal. This prevents "a phase lag" and "a phase lead" from being detected alternately.

Further, since the rising edge of the reproduced signal (for instance, of the 2T pattern $Q_{2T}$ of the PR(1,1) waveform) is detected based on the above-described edge determination logic from the successive sampled values $Y_{t-3}$, $Y_{t-2}$, $Y_{t-1}$, and $Y_{t-0}$, edge detection is performable with good accuracy even if the clock signal is in the step-out state as shown in FIG. 7. Therefore, the phase of the clock signal can be adjusted earlier to the right phase determined from the synchronization pattern.

Figure 9:
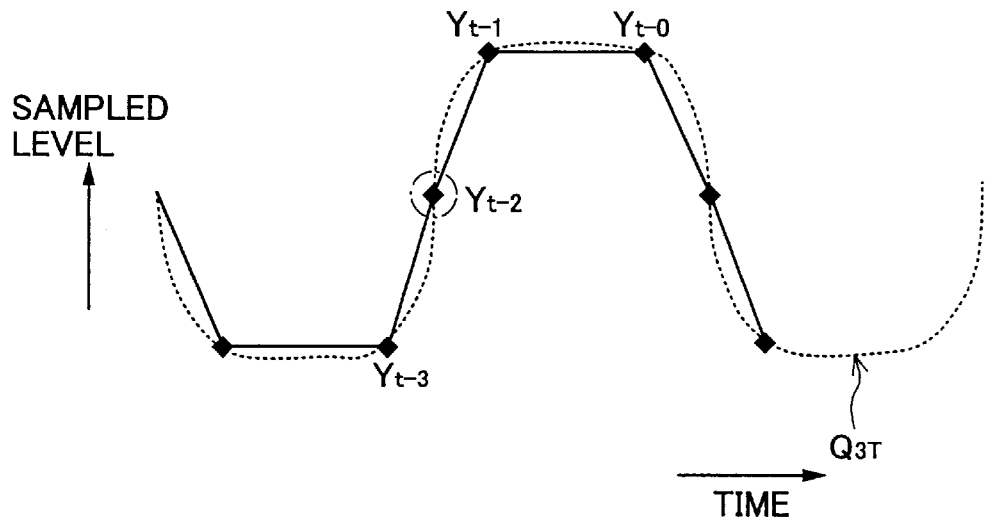
FIG. 9 is a diagram showing a detection of a rising edge of a reproduced signal corresponding to a 3T pattern of the PR(1,1) waveform.

Moreover, according to the above-described edge determination logic, in addition to the rising edge of the reproduced signal of the 2T pattern $Q_{2T}$ of the PR(1,1) waveform, the rising edge of a reproduced signal of the 3T pattern $Q_{3T}$ of the PR(1,1) waveform, for instance, can be detected as shown in FIG. 9. In the case of recording a signal on the magneto-optical disk 10 at a high density, if the 2T pattern $Q_{2T}$ of the PR(1,1) waveform is employed as a synchronization pattern, the amplitude of a reproduced signal is reduced by signal interference. In such a case, it is advantageous to employ the 3T pattern $Q_{3T}$ of the PR(1,1) waveform as a synchronization pattern.

In FIG. 9, the four successive sampled values $Y_{t-3}$, $Y_{t-2}$, $Y_{t-1}$, and $Y_{t-0}$ satisfy the above-described determined that the even-numberth sampled value $Y_{t-2}$ between the odd-numberth sampled values $Y_{t-3}$ and $Y_{t-1}$ corresponds to the rising edge of the reproduced signal of the 3T pattern $Q_{3T}$.

In the above-described cases, the rising edges of the reproduced signals corresponding to two types of synchronization patterns, that is, the 2T pattern $Q_{2T}$ and 3T pattern $Q_{3T}$, are determined by the same rising edge determination logic. However, an edge determination method is not limited to this. An edge determination logic circuit that performs processing based on its own determination logic may be provided for each of various synchronization patterns so that, when a recording medium is set in the data reproduction apparatus, one of the edge determination logic circuits which performs processing based on the determination logic corresponding to a synchronization pattern recorded on the recording medium may be selected.

The above-described edge determination logic circuit 332 determines the rising edge of the reproduced signal, but may determine the trailing edge of the reproduced signal. In such a case, the edge determination logic circuit 332 performs processing based on the following logic, which will be below described with reference to FIG. 5.

After step S1, using the above-described absolute values A and B defined by $A = |Y_{t-0} - Y_{t-2}|$ and $B = |Y_{t-1} - Y_{t-3}|$ and obtained in step S2, the edge determination circuit 332 determines in step S3-3 whether the following conditions 5 and 6 are satisfied:

Condition 5 . . . A>B

Condition 6 . . . $Y_{t-0} < Y_{t-2}$

If it is determined in step S3-3 that the conditions 5 and 6 are satisfied, the edge determination circuit 332 determines in step S4-3 that the sampled value $Y_{t-1}$ corresponds to the trailing edge of the reproduced signal(case 1).

In other words, when the absolute value A of the difference between the even-numberth sampled values $Y_{t-2}$ and $Y_{t-0}$ of the four successive sampled values $Y_{t-3}$, $Y_{t-2}$, $Y_{t-1}$, and $Y_{t-0}$ is larger than the absolute value B of the difference between the odd-numberth sampled values $Y_{t-3}$ and $Y_{t-1}$ and the sampled value $Y_{t-2}$ is larger than the sampled value $Y_{t-0}$ so that the difference therebetween is positive, the edge determination logic circuit 332 determines that the sampled value $Y_{t-1}$ between the sampled values $Y_{t-2}$ and $Y_{t-0}$ corresponds to the trailing edge of the reproduced signal.

After step S4-3, the operation proceeds to step S5, where the next set of four sampled values are obtained at the next sampling timing, and thereafter, returns to step S1.

If it is determined in step S3-3 that both of the conditions 5 and 6 are not satisfied, the operation goes to step S5 and then returns to step S1.

On the other hand, if it is determined in step S3-4 that the following conditions 7 and 8 are satisfied, the edge determination circuit 332 determines in step S4-4 that the sampled value $Y_{t-2}$ corresponds to the trailing edge of the reproduced signal (case 2):

Condition 7 ... A≦B

Condition 8 ... $Y_{t-1} < Y_{t-3}$

In other words, when the absolute value B of the difference between the odd-numberth sampled values $Y_{t-3}$ and $Y_{t-1}$ of the four successive sampled values $Y_{t-3}$, $Y_{t-2}$, $Y_{t-1}$, and $Y_{t-0}$ is larger than or equal to the absolute value A of the difference between the even-numberth sampled values $Y_{t-2}$ and $Y_{t-0}$ and the sampled value $Y_{t-3}$ is larger than the sampled value $Y_{t-1}$ so that the difference therebetween is positive, the edge determination logic circuit 332 determines that the sampled value $Y_{t-2}$ between the sampled values $Y_{t-3}$ and $Y_{t-1}$ corresponds to the trailing edge of the reproduced signal.

After step S4-4, the operation proceeds to step S5, where the next set of four sampled values are obtained at the next sampling timing, and thereafter, returns to step S1.

If it is determined in step S3-4 that both of the conditions 7 and 8 are not satisfied, the operation goes to step S5 and then returns to step S1.

In the above-described cases, the synchronization pattern employed for adjusting the phase of the clock signal is either 2T pattern $Q_{2T}$ or 3T pattern $Q_{3T}$ of the PR(1,1) waveform. However, the synchronization pattern is not limited to these, but instead any well-known pattern may be used as the synchronization pattern. In such a case, the edge of a reproduced signal of the synchronization pattern can be determined on the basis of the change of state of sampled values that, correctly, should be obtained at edge parts determined in accordance with the synchronization pattern.

Further, in the above-described cases, after rising edge detection is performed once on the reproduced signal corresponding to the synchronization pattern in the edge determination logic circuit 332, the edge pulse is output in the given cycle determined by the synchronization pattern. However, the edge pulse may be output automatically in the given cycle determined by the synchronization pattern after the rising edge detection on the reproduced signal corresponding to the synchronization pattern is performed a plurality of times in the edge determination logic circuit 332.

As described above, according to the clock adjustment device of the present invention, after the edge of the reproduced signal corresponding to the synchronization pattern is detected, the phase of the clock signal is adjustable in a cycle in which the reproduced signal rises. Consequently, even if the phase of the clock signal is not completely adjusted during the readout of the synchronization pattern, the phase of the clock signal is precisely adjusted at a position expected to correspond to the rising edge of the reproduced signal. Therefore, the phase of the clock signal is stably adjustable based on the state of change of the sampled values obtained in synchronism with the clock signal from the reproduced signal corresponding to the synchronization pattern.

In this embodiment, the edge determination logic circuit 332 of FIG. 4 corresponds to an edge detection (determination) part, the edge pulse generation circuit 333 of FIG. 4 corresponds to a timing signal output part, and the phase difference detection part 31, the DAC 32, and the phase adjustment oscillation unit 33 of FIG. 2 correspond to a phase adjustment part of the clock adjustment device of the present invention. The phase difference detection part 31 corresponds to a phase difference amount detection part of the clock adjustment device.

Further, the count value (output interval value) setting function of the counter 333b corresponds to an output cycle setting part of the clock adjustment device.

Furthermore, the edge detection part 330 corresponds to an edge detection device according to the present invention.

The present invention is not limited to the specifically disclosed embodiment, but variations and modifications may be made without departing from the scope of the present invention.

The present application is based on Japanese priority application No. 2001-165588 filed on May 31, 2001, the entire contents of which are hereby incorporated by reference.

What is claimed is:

1. A clock adjustment device for a data reproduction apparatus for reproducing recorded data from a recording medium in accordance with a maximum likelihood decoding algorithm corresponding to a recording code of partial response by using sampled values obtained by sampling a reproduced signal from the recording medium in synchronism with a clock signal, the reproduced signal corresponding to a predetermined synchronization pattern, the clock adjustment device comprising:

an edge detection part detecting an edge of the reproduced signal based on a state of change of the sampled values;

a timing signal output part outputting a timing signal in a given cycle determined by the synchronization pattern from a timing at which the edge of the reproduced signal is detected; and a phase adjustment part adjusting a phase of the clock signal when the edge of the reproduced signal is detected and every time the timing signal is output.

2. The clock adjustment device as claimed in claim 1, wherein said timing signal output part measures the given cycle based on the clock signal.

3. The clock adjustment device as claimed in claim 1, wherein said phase adjustment part comprises a phase difference amount detection part detecting a phase difference amount of the clock signal based on the state of change of the sampled values and adjusts the phase of the clock signal based on the detected phase difference amount.

4. The clock adjustment device as claimed in claim 1, further comprising an output cycle setting part setting the given cycle in which said timing signal output part outputs the timing signal.

5. The clock adjustment device as claimed in claim 1, wherein said edge detection part comprises an edge determination part determining, using first through fourth successive sampled values in an order sampled and based on a relationship between the first and third sampled values and a relationship between the second and fourth sampled values, whether or not the second or third sampled value corresponds to the edge of the reproduced signal.

6. The clock adjustment device as claimed in claim 5, wherein said edge determination part determines that the second sampled value corresponds to a rising edge of the reproduced signal if an absolute value of a difference between the first and third sampled values is larger than or equal to that of a difference between the second and fourth sampled values and the third sampled value is larger than the first sampled value.

7. The clock adjustment device as claimed in claim 5, wherein said edge determination part determines that the third sampled value corresponds to a rising edge of the reproduced signal if an absolute value of a difference between the second and fourth sampled values is larger than that of a difference between the first and third sampled values and the fourth sampled value is larger than the second sampled value.

8. The clock adjustment device as claimed in claim 5, wherein said edge determination part determines that the second sampled value corresponds to a trailing edge of the reproduced signal if an absolute value of a difference between the first and third sampled values is larger than or equal to that of a difference between the second and fourth sampled values and the first sampled value is larger than the third sampled value.

9. The clock adjustment device as claimed in claim 5, wherein said edge determination part determines that the third sampled value corresponds to a trailing edge of the reproduced signal if an absolute value of a difference between the second and fourth sampled values is larger than that of a difference between the first and third sampled values and the second sampled value is larger than the fourth sampled value.

10. A data reproduction apparatus for reproducing recorded data from a recording medium in accordance with a maximum likelihood decoding algorithm corresponding to a recording code of partial response by using sampled values obtained by sampling a reproduced signal from the recording medium in synchronism with a clock signal, the reproduced signal corresponding to a predetermined synchronization pattern, the data reproduction apparatus comprising:

a clock adjustment device, the clock adjustment device comprising:

an edge detection part detecting an edge of the reproduced signal based on a state of change of the sampled values;

a timing signal output part outputting a timing signal in a given cycle determined by the synchronization pattern from a timing at which the edge of the reproduced signal is detected; and a phase adjustment part adjusting a phase of the clock signal when the edge of the reproduced signal is detected and every time the timing signal is output.

11. An edge detection device for detecting an edge of a reproduced signal from a recording medium, the reproduced signal corresponding to a predetermined synchronization pattern, the edge detection device comprising:

an edge determination part determining, using first through fourth successive sampled values in an order sampled from the reproduced signal and based on a relationship between the first and third sampled values and a relationship between the second and fourth sampled values, whether or not the second or third sampled value corresponds to the edge of the reproduced signal.

12. The edge detection device as claimed in claim 11, wherein said edge determination part determines that the second sampled value corresponds to a rising edge of the reproduced signal if an absolute value of a difference between the first and third sampled values is larger than or equal to that of a difference between the second and fourth sampled values and the third sampled value is larger than the first sampled value.

13. The edge detection device as claimed in claim 11, wherein said edge determination part determines that the third sampled value corresponds to a rising edge of the reproduced signal if an absolute value of a difference between the second and fourth sampled values is larger than that of a difference between the first and third sampled values and the fourth sampled value is larger than the second sampled value.

14. The edge detection device as claimed in claim 11, wherein said edge determination part determines that the second sampled value corresponds to a trailing edge of the reproduced signal if an absolute value of a difference between the first and third sampled values is larger than or equal to that of a difference between the second and fourth sampled values and the first sampled value is larger than the third sampled value.

15. The edge detection device as claimed in claim 11, wherein said edge determination part determines that the third sampled value corresponds to a trailing edge of the reproduced signal if an absolute value of a difference between the second and fourth sampled values is larger than that of a difference between the first and third sampled values and the second sampled value is larger than the fourth sampled value.

16. The edge detection device as claimed in claim 11, further comprising a timing signal output part outputting a timing signal in a given cycle determined by the synchronization pattern from a timing at which the edge of the reproduced signal is detected.

17. The edge detection device as claimed in claim 16, further comprising an output cycle setting part setting the given cycle in which said timing signal output part outputs the timing signal.

18. A method of detecting an edge of a reproduced signal from a recording medium, the method comprising the steps of:

(a) obtaining first through fourth successive sampled values in an order sampled from the reproduced signal;

(b) calculating a first difference between the first and third sampled values and a second difference between the second and fourth sampled values; and (c) determining whether the second or third sampled value corresponds to the edge of the reproduced signal based on the first and second differences obtained in said step (b).

19. The method as claimed in claim 18, wherein said step (c) determines that the second sampled value corresponds to a rising edge of the reproduced signal if an absolute value of the first difference is larger than or equal to that of the second difference and the third sampled value is larger than the first sampled value.

20. The method as claimed in claim 18, wherein said step (c) determines that the third sampled value corresponds to a rising edge of the reproduced signal if an absolute value of the second difference is larger than that of the first difference and the fourth sampled value is larger than the second sampled value.

21. The method as claimed in claim 18, wherein said step (c) determines that the second sampled value corresponds to a trailing edge of the reproduced signal if an absolute value of the first difference is larger than or equal to that of the second difference and the first sampled value is larger than the third sampled value.

22. The edge detection device as claimed in claim 18, wherein said step (c) determines that the third sampled value corresponds to a trailing edge of the reproduced signal if an absolute value of the second difference is larger than that of the first difference and the second sampled value is larger than the fourth sampled value.

* * * * *